United States Patent
Makled et al.

(10) Patent No.: US 9,926,872 B2
(45) Date of Patent: Mar. 27, 2018

(54) METHODS AND SYSTEMS FOR ESTIMATING AMBIENT PRESSURE USING AN OXYGEN SENSOR

(71) Applicant: Ford Global Technologies, LLC, Dearborn, MI (US)

(72) Inventors: Daniel A. Makled, Dearborn, MI (US); Michael McQuillen, Warren, MI (US); Gopichandra Surnilla, West Bloomfield, MI (US); Richard E. Soltis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 14/997,309

(22) Filed: Jan. 15, 2016

(65) Prior Publication Data

US 2017/0204800 A1 Jul. 20, 2017

(51) Int. Cl.
*F02D 35/00* (2006.01)
*F02D 41/14* (2006.01)
(Continued)

(52) U.S. Cl.
CPC ......... *F02D 41/1458* (2013.01); *B60W 20/10* (2013.01); *F01N 9/00* (2013.01);
(Continued)

(58) Field of Classification Search
CPC ............... F02D 41/1458; F02D 41/222; F02D 41/1456; F02D 41/20; F02D 41/263;
(Continued)

(56) References Cited

U.S. PATENT DOCUMENTS 4,825,841 A * 5/1989 Norota ............... F02D 41/005
123/676
8,296,042 B2 10/2012 Xiao et al.
(Continued)

FOREIGN PATENT DOCUMENTS

| EP | 2514955 B1 | 11/2014 | | |
|---|---|---|---|---|
| JP | 60050249 A | * | 3/1985 | ......... F02D 41/1497 |
| JP | 60053635 A | * | 3/1985 | ............. F02D 41/18 |

OTHER PUBLICATIONS

Makled, Daniel A. et al., "Methods and System for Fuel Ethanol Content Estimation and Engine Control," U.S. Appl. No. 14/626,623, filed Feb. 19, 2015, 68 pages.
(Continued)

*Primary Examiner* — Genna M Mott
(74) *Attorney, Agent, or Firm* — Julia Voutyras; McCoy Russell LLP

(57) ABSTRACT

Methods and systems are provided for leveraging the pressure dependency of an oxygen sensor for estimating an engine ambient pressure. An intake or exhaust oxygen sensor is used for ambient pressure estimation by applying a reference voltage to the sensor while the engine is being pulled-down in a hybrid vehicle, and correcting an output of the sensor for dilution effects due to ambient humidity. The estimated ambient pressure is used to correct or confirm pressure estimated by other sources, such as other pressure sensors or a pressure model, as well as to tune the performance of the engine.

20 Claims, 6 Drawing Sheets

(51) Int. Cl.
  *B60W 20/10* (2016.01)
  *F01N 13/00* (2010.01)
  *F02D 41/20* (2006.01)
  *F02D 41/26* (2006.01)
  *F02M 35/10* (2006.01)
  *F01N 9/00* (2006.01)
  *F02D 41/22* (2006.01)
  *F02D 41/04* (2006.01)
  *F02D 41/12* (2006.01)

(52) U.S. Cl.
  CPC ....... *F01N 13/008* (2013.01); *F02D 35/0015* (2013.01); *F02D 41/1456* (2013.01); *F02D 41/1495* (2013.01); *F02D 41/20* (2013.01); *F02D 41/222* (2013.01); *F02D 41/263* (2013.01); *F02M 35/10393* (2013.01); *F01N 2560/025* (2013.01); *F01N 2590/11* (2013.01); *F01N 2900/08* (2013.01); *F01N 2900/10* (2013.01); *F01N 2900/12* (2013.01); *F02D 41/042* (2013.01); *F02D 41/123* (2013.01); *F02D 41/144* (2013.01); *F02D 2041/2051* (2013.01); *F02D 2200/0406* (2013.01); *F02D 2200/0408* (2013.01); *F02D 2200/0418* (2013.01); *F02D 2200/101* (2013.01); *F02D 2200/704* (2013.01); *Y02T 10/40* (2013.01); *Y02T 10/47* (2013.01)

(58) Field of Classification Search
  CPC ................ F02D 41/123; F02D 41/144; F02D 2200/704; F02D 2200/0406; F02D 41/042; F02D 2200/101; F02D 2200/0418; F02D 2200/0408; F02D 2041/2051; F02D 35/0015; B60W 20/10; F02M 35/10393; Y02T 10/47; Y02T 10/40; F01N 2900/10; F01N 2590/11; F01N 9/00; F01N 13/008; F01N 2900/08; F01N 2900/12; F01N 2560/025
  See application file for complete search history.

(56) References Cited

U.S. PATENT DOCUMENTS

| | | |
|---|---|---|
| 8,354,016 B2 | 1/2013 | Kerns et al. |
| 8,495,996 B2 | 7/2013 | Soltis et al. |
| 8,522,760 B2 | 9/2013 | Soltis |
| 8,670,920 B2 | 3/2014 | Bowling et al. |
| 8,731,806 B2 | 5/2014 | Soltis et al. |
| 8,857,155 B2 | 10/2014 | Surnilla et al. |
| 2013/0110376 A1 | 5/2013 | Surnilla et al. |
| 2014/0202437 A1 | 7/2014 | Surnilla et al. |

OTHER PUBLICATIONS

Makled, Daniel A. et al., "Methods and Systems for Estimating Exhaust Pressure With a Variable Voltage Oxygen Sensor," U.S. Appl. No. 14/637,060, filed Mar. 3, 2015, 57 pages.

* cited by examiner

METHODS AND SYSTEMS FOR ESTIMATING AMBIENT PRESSURE USING AN OXYGEN SENSOR

FIELD

The present description relates generally to methods and systems for operating an intake or exhaust oxygen sensor of an internal combustion engine for ambient pressure estimation.

BACKGROUND/SUMMARY

Measurements and/or estimates of ambient pressure may be used as inputs in various vehicle control strategies in order to control engine operation. In one example, engines may include a dedicated, standalone barometric pressure sensor positioned in an intake passage of the engine (e.g., at or around an intake air filter) to measure ambient (or barometric) pressure. However, dedicated ambient pressure sensors may increase engine system costs and engine system control complexity. Some engine powertrain configurations may not include an ambient pressure sensor. Therein, the ambient pressure may be modeled based on engine operating conditions and/or other sensor measurements. However, the inventors herein have recognized that these ambient pressure models may have errors that may cascade into additional models that use the modeled ambient pressure as an input. Additionally, certain models may be bounded by a window in which ambient pressure may only be modeled under selected engine operating conditions. As a result, engine control based on ambient pressure estimates during operation outside of the window may have reduced accuracy.

In one example, the issues described above may be addressed by a method for: when propelling a hybrid vehicle using engine torque, estimating an exhaust air-fuel ratio via an exhaust oxygen sensor, and when propelling the vehicle using motor torque, estimating an ambient pressure of intake air via the exhaust oxygen sensor. In this way, an existing engine sensor (e.g., an exhaust oxygen sensor or an intake oxygen sensor) may be used to more accurately estimate engine ambient pressures, thereby increasing an accuracy of engine control based on ambient pressure estimates.

As one example, an exhaust gas sensor (e.g., exhaust oxygen sensor) may be positioned in an exhaust passage of an engine and operated to provide indications of various exhaust gas constituents. The engine may be coupled in a hybrid electric vehicle. During conditions when the engine is operating fueled, such as when the vehicle is propelled via engine torque, the exhaust gas sensor may be operated as an oxygen sensor at a reference voltage for enabling air-fuel ratio control. Additionally, the sensor may be operated as a variable voltage (VVs) oxygen sensor for estimating ambient humidity during conditions when the engine is operating non-fueled. When operating in the VVs mode, a reference voltage of the exhaust gas sensor is increased from a lower, base voltage (e.g., approximately 450 my) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor. The inventors herein have further recognized that exhaust gas sensors have a characteristic pressure dependency. Since pressure changes the ability for oxygen to pass through the sensor's diffusion barrier, ambient pressure changes may be reflected in the sensor's pumping current output. Thus, during conditions when the engine is not being fueled, such as during an engine pull-down, or during a deceleration fuel shut-off event, the exposure of the exhaust gas sensor to ambient air at ambient pressure can be leveraged for ambient pressure estimation. In particular, when there is no engine fueling or combustion, the intake air in the intake passage of the engine is representative of ambient air. Therefore, the pressure of the intake air during those conditions is representative of an ambient pressure. During such conditions, an oxygen sensor can be used as a pressure sensor. Therein, an output of the oxygen sensor while operating at the lower reference voltage may be corrected based on an ambient humidity estimate. Then, based on an offset between the corrected oxygen sensor pumping current relative to a reference pumping current, and further based on a pressure dependency of the sensor, the ambient pressure may be determined. The pressure dependency of the sensor may have been previously characterized based on the sensor's response to varied pressure in ambient air. As an example, the ambient pressure may be characterized in response to a change in elevation of the vehicle as measured by an altimeter sensor. When fueled engine operation is resumed, engine operating parameters may be adjusted by a controller based on the determined ambient pressure estimate.

In this way, the need for a dedicated ambient pressure sensor is reduced, providing cost benefits over use of a standalone pressure sensor. In addition, a more accurate approach for estimating ambient pressure is provided in case of degradation of an existing ambient pressure sensor. As such, this allows the pressure information from the oxygen sensor to be used to tune powertrain performance instead of relying on potentially inaccurate inference from models. The technical effect of relying on an existing oxygen sensor for air-fuel ratio control during conditions when the engine is operating fueled, while using the same sensor for ambient pressure and humidity estimation during conditions when the engine is operating unfueled is that a new source for ambient pressure measurement is provided using pre-existing hardware. By relying on the pressure dependence of the oxygen sensor, pressure information from the oxygen sensor can be used to confirm the accuracy of other pressure sources (e.g., existing pressure sensors).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
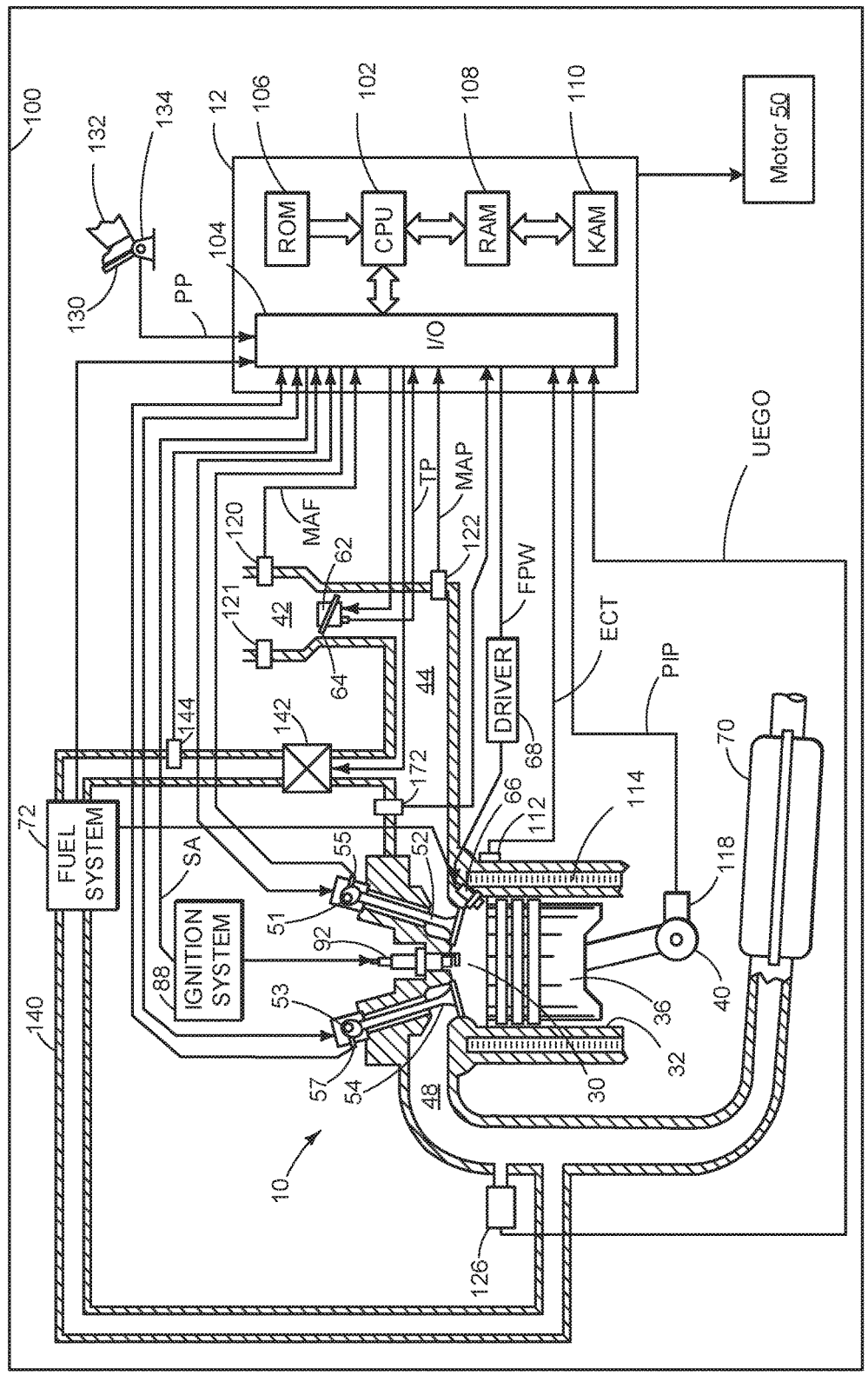
FIG. 1 shows a schematic diagram of an engine system coupled to a hybrid vehicle, the engine system including an intake oxygen sensor and an exhaust gas sensor.
Figure 3:
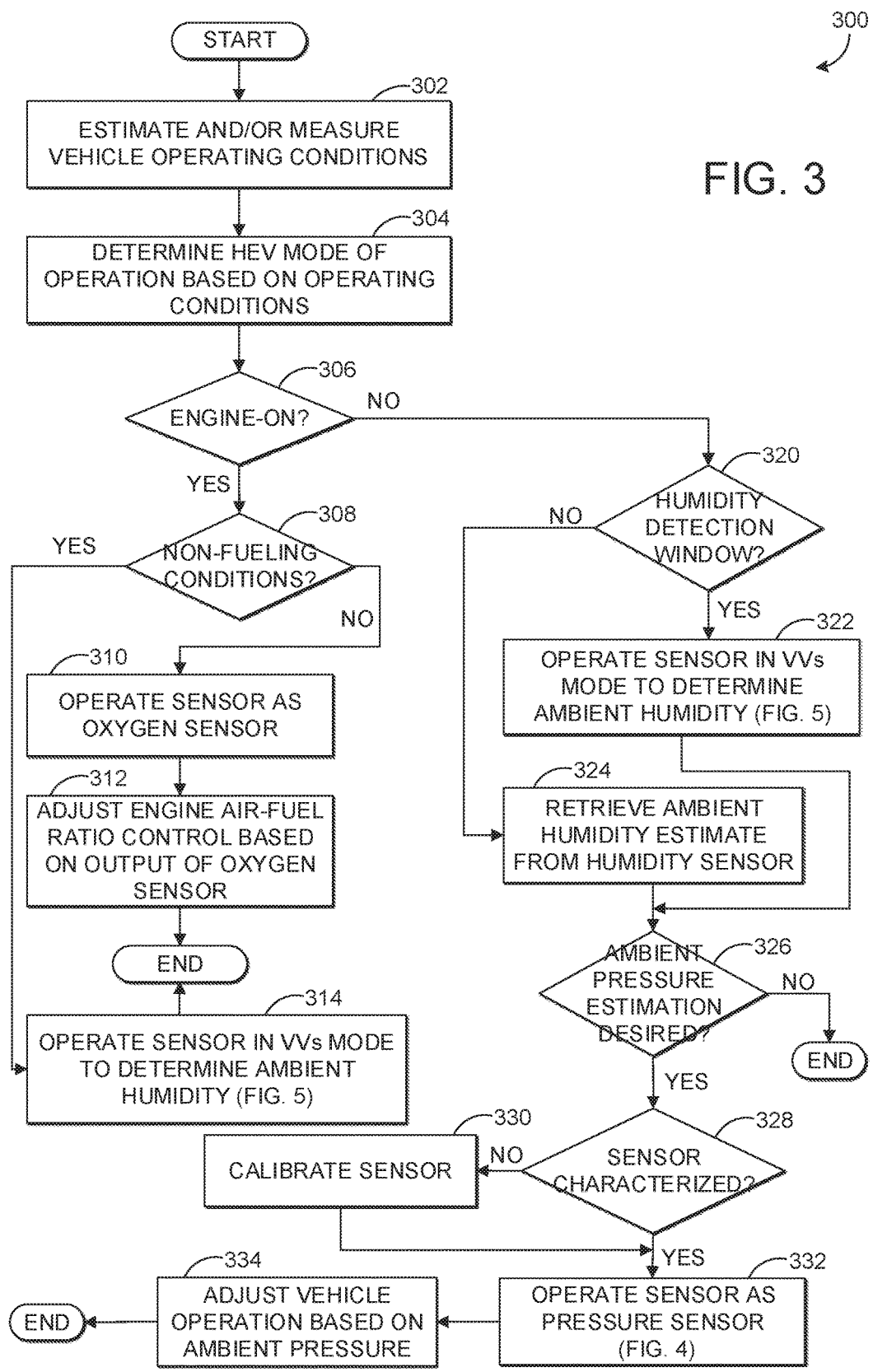
FIG. 3 shows a flow chart of a method for operating the oxygen sensor(s) of FIG. 1 as an oxygen sensor during engine fueling conditions and as a pressure (and/or humidity sensor) during engine non-fueling conditions.
Figure 4:
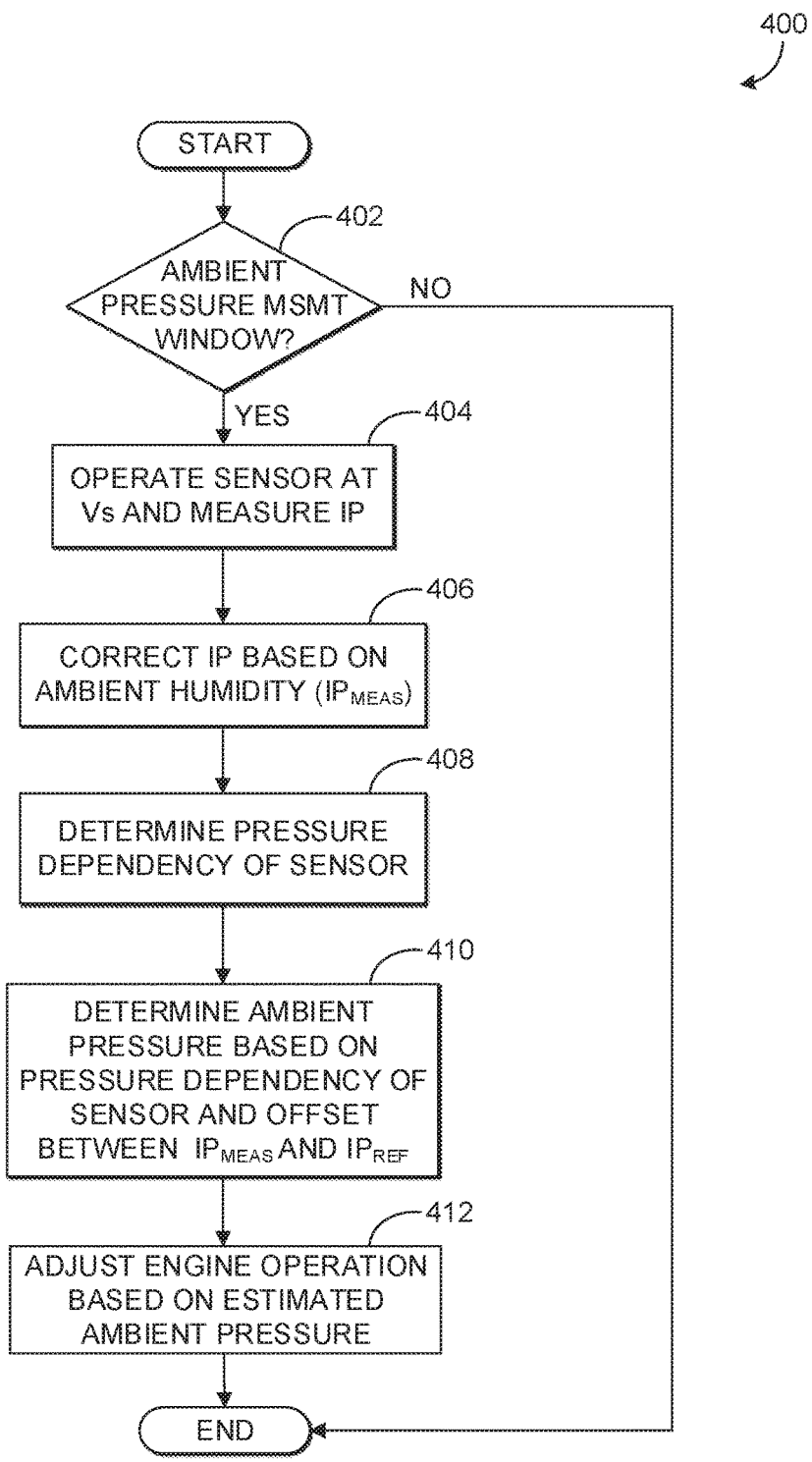
FIG. 4 shows a flow chart of a method for estimating ambient pressure in an engine with an engine intake or exhaust oxygen sensor.
Figure 5:
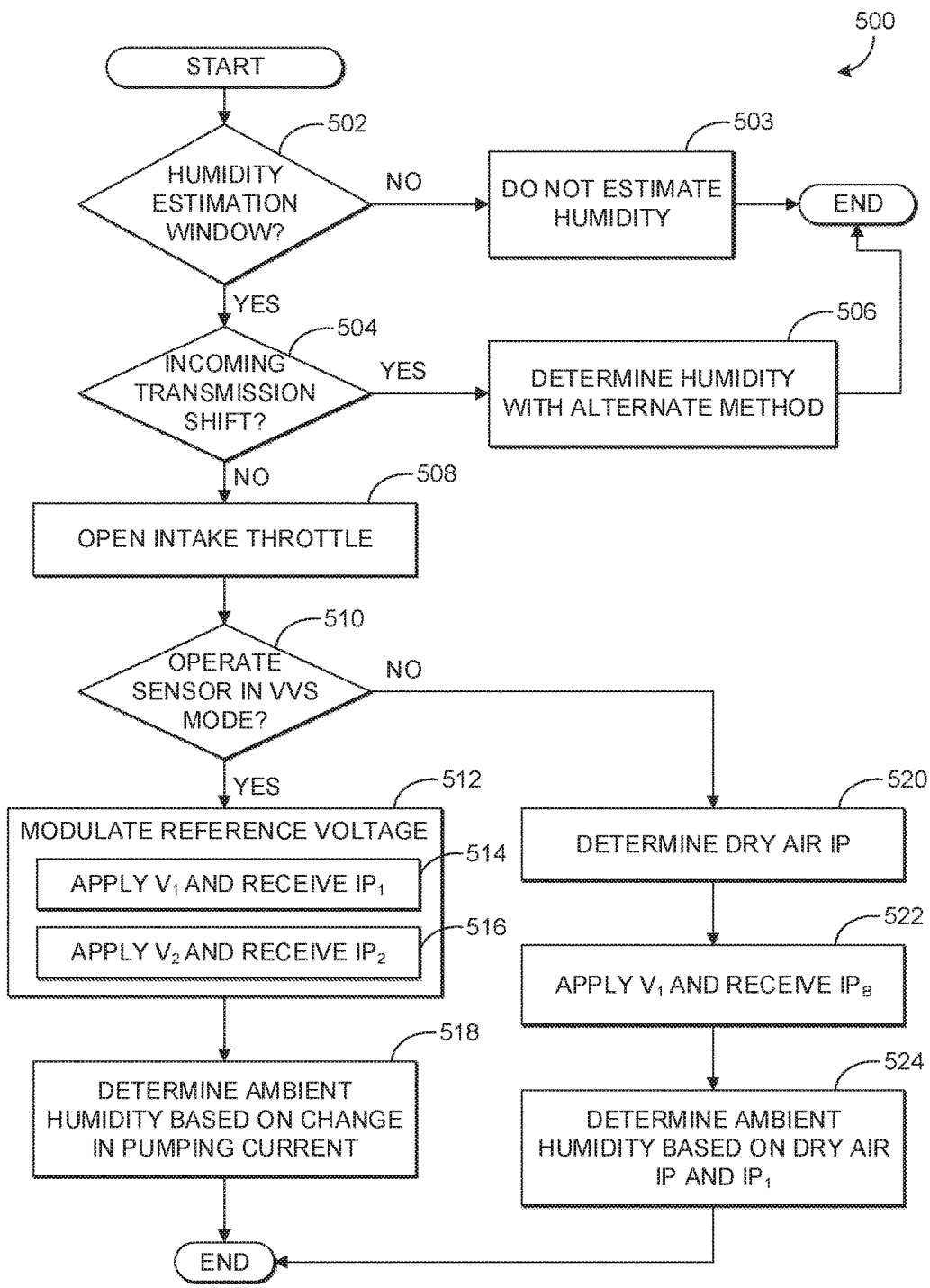
FIG. 5 shows a flow chart of a method for estimating ambient humidity.

The following description relates to systems and methods for opportunistically estimating an ambient pressure of aircharge in an engine coupled in a hybrid electric vehicle. As shown in FIG. 1, an engine may include an exhaust oxygen sensor located in an exhaust passage of the engine and/or an intake oxygen sensor located in an intake passage of the engine. The oxygen sensor may be operable as a variable voltage (VVs) oxygen sensor, such as the VVs sensor shown in FIG. 2, during selected conditions. Outputs of the oxygen sensor in the form of pumping currents may be used to determine an air/fuel ratio of the exhaust gas, or an oxygen content of the intake aircharge, and used for combustion air/fuel ratio control. In addition, a pressure dependency (FIG. 6) of the sensors may be leveraged during conditions when the sensor is only exposed to ambient air to determine the ambient pressure of ambient air flowing into the engine. For example, a controller may be configured to operate the sensor as an oxygen sensor when the engine is operating fueled and as a pressure sensor when the engine is operating unfueled (FIGS. 3-4). In addition, the sensor may be operated as a variable voltage sensor for ambient humidity estimation (FIG. 5). The controller may then use the oxygen sensor ambient pressure estimate directly for engine control, or use it to confirm and/or correct an alternate ambient pressure model. In this way, engine control based on ambient pressure estimates may be improved at a wider range of engine operating conditions.

Referring now to FIG. 1, a schematic diagram showing one cylinder of multi-cylinder engine 10, which may be included in a propulsion system of an automobile, is illustrated. In the depicted example, engine 10 is coupled in hybrid electric vehicle 100 wherein vehicle wheels can be propelled via engine torque derived from engine 10 and/or motor torque derived from motor 50.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Fuel tank in fuel system 72 may hold fuels with different fuel qualities, such as different fuel compositions. These differences may include different alcohol content, different octane, different heats of vaporization, different fuel blends, and/or combinations thereof etc. The engine may use an alcohol containing fuel blend such as E85 (which is approximately 85% ethanol and 15% gasoline) or M85 (which is approximately 85% methanol and 15% gasoline). Alternatively, the engine may operate with other ratios of gasoline and ethanol stored in the tank, including 100% gasoline and 100% ethanol, and variable ratios there-between, depending on the alcohol content of fuel supplied by the operator to the tank. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

The day to day variations in tank refilling can thus result in frequently varying fuel composition of the fuel in fuel system 72, thereby affecting the fuel composition and/or fuel quality delivered by injector 66. The different fuel compositions injected by injector 166 may herein be referred to as a fuel type. In one example, the different fuel compositions may be qualitatively described by their research octane number (RON) rating, alcohol percentage, ethanol percentage, etc.

It will be appreciated that while in one embodiment, the engine may be operated by injecting the variable fuel blend via a direct injector, in alternate embodiments, the engine may be operated by using two injectors and varying a relative amount of injection from each injector. It will be further appreciated that when operating the engine with a boost from a boosting device such as a turbocharger or supercharger (not shown), the boosting limit may be increased as an alcohol content of the variable fuel blend is increased.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In one embodiment, the intake passage 42 may additionally include a humidity sensor 121 for measuring ambient humidity. In another embodiment, the humidity sensor 121 may additionally or alternatively be placed in the exhaust passage 48.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 (e.g., exhaust oxygen sensor) is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The sensor may also be operated in a variable voltage mode during non-fueling conditions for estimating a humidity content of ambient air received in the engine. Further, as elaborated herein, during selected engine non-fueling conditions, the output of the exhaust gas oxygen sensor may be used to infer an ambient pressure of ambient air received in the engine. In this way, the same sensor can be used to estimate multiple aircharge parameters. In addition, pressure or humidity estimated by the oxygen sensor can be used to confirm the accuracy of other pressure or humidity information sources (such as other pressure or humidity sensors).

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. An EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

A linear oxygen sensor (herein also referred to an intake oxygen sensor) 172 may be positioned at the intake passage, downstream of the intake throttle. Intake oxygen sensor 172 may be used to facilitate EGR regulation. In addition, the intake oxygen sensor may be used to estimate an oxygen content of ambient air received in the intake passage. The sensor may also be operated in a variable voltage mode during non-fueling conditions for estimating a humidity content of ambient air received in the intake passage. Further, as elaborated herein, during selected engine non-fueling conditions, the output of the intake oxygen sensor may be used to infer an ambient pressure of ambient air received in the intake passage. In this way, the same sensor can be used to estimate multiple intake air parameters. In addition, pressure or humidity estimated by the oxygen sensor can be used to confirm the accuracy of other pressure or humidity information sources (such as other pressure or humidity sensors).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing instructions executable by processor 102 for performing the methods described below as well as other variants that are anticipated but not specifically listed. Example methods are described with reference to FIGS. 3-5.

As described above, FIG. 1 shows only one cylinder of a multi-cylinder engine, and each cylinder may similarly include its own set of intake/exhaust valves, fuel injector, spark plug, etc.

Figure 2:
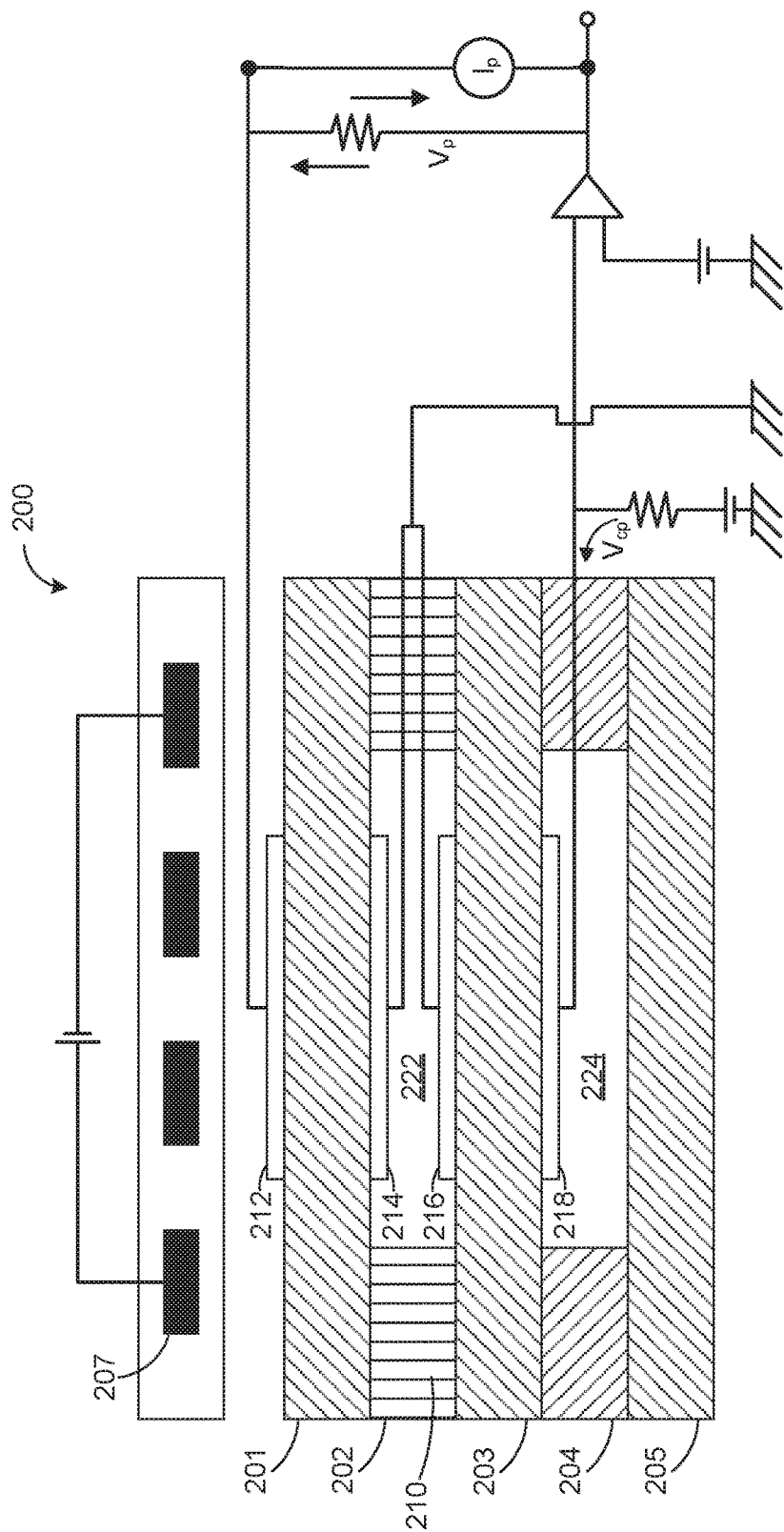
FIG. 2 shows a schematic diagram of an example oxygen sensor.

Next, FIG. 2 shows a schematic view of an example embodiment of an oxygen sensor 200 configured to measure a concentration of oxygen (O2) in an intake or exhaust gas stream. Sensor 200 may operate as UEGO sensor 126 and/or as intake oxygen sensor 172 of FIG. 1, for example. Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments, a heater 207 may be disposed in thermal communication with the layers to increase the ionic conductivity of the layers. While the depicted UEGO sensor is formed from five ceramic layers, it will be appreciated that the UEGO sensor may include other suitable numbers of ceramic layers.

Layer 202 includes a material or materials creating a diffusion path 210. Diffusion path 210 is configured to introduce exhaust gases into a first internal cavity 222 via diffusion. Diffusion path 210 may be configured to allow one or more components of exhaust gases, including but not limited to a desired analyte (e.g., O2), to diffuse into internal cavity 222 at a more limiting rate than the analyte can be pumped in or out by pumping electrodes pair 212 and 214. In this manner, a stoichiometric level of O2 may be obtained in the first internal cavity 222.

Sensor 200 further includes a second internal cavity 224 within layer 204 separated from the first internal cavity 222 by layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping voltage Vp. Herein, second internal cavity 224 may be referred to as a reference cell.

A pair of sensing electrodes 216 and 218 is disposed in communication with first internal cavity 222 and reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture.

A pair of pumping electrodes 212 and 214 is disposed in communication with internal cavity 222, and is configured to electrochemically pump a selected gas constituent (e.g., $O_2$) from internal cavity 222 through layer 201 and out of sensor 200. Alternatively, the pair of pumping electrodes 212 and 214 may be configured to electrochemically pump a selected gas through layer 201 and into internal cavity 222. Herein, pumping electrodes pair 212 and 214 may be referred to as an $O_2$ pumping cell.

Electrodes 212, 214, 216, and 218 may be made of various suitable materials. In some embodiments, electrodes 212, 214, 216, and 218 may be at least partially made of a material that catalyzes the dissociation of molecular oxygen. Examples of such materials include, but are not limited to, electrodes containing platinum and/or silver.

The process of electrochemically pumping the oxygen out of or into internal cavity 222 includes applying a voltage Vp (e.g., reference voltage) across pumping electrode pair 212 and 214. The pumping voltage Vp applied to the O2 pumping cell pumps oxygen into or out of first internal cavity 222 in order to maintain a stoichiometric level of oxygen in the cavity pumping cell. The resulting pumping current Ip is proportional to the concentration of oxygen in the assessed charge (exhaust gas when the sensor is an exhaust gas sensor, intake air when the sensor is an intake oxygen sensor). A control system (not shown in FIG. 2) generates the pumping current signal Ip as a function of the intensity of the applied pumping voltage Vp required to maintain a stoichiometric level within the first internal cavity 222. Thus, a lean mixture will cause oxygen to be pumped out of internal cavity 222 and a rich mixture will cause oxygen to be pumped into internal cavity 222.

It should be appreciated that the oxygen sensor described herein is merely an example embodiment of a UEGO sensor or intake oxygen sensor, and that other embodiments of UEGO/intake oxygen sensors may have additional and/or alternative features and/or designs.

Further, the oxygen sensor of FIG. 2 may be operable as a variable voltage oxygen sensor configured to operate at a first, lower voltage (e.g., first reference voltage) where water molecules are not dissociated and a second, higher voltage (e.g., second reference voltage) where water molecules are fully dissociated. As such, the second voltage is higher than the first voltage.

As elaborated below, the oxygen sensor of FIG. 2 can be advantageously used to estimate an ambient pressure as well as an ambient humidity of ambient air flowing through an engine intake passage. The inventors herein have recognized that oxygen sensors have a characteristic pressure dependency. Since pressure changes the ability for oxygen to pass through the sensor's diffusion barrier, pressure changes (e.g., ambient pressure changes) in the environment in which the sensor is placed (e.g., ambient air in intake passage and engine) may be reflected in the sensor's pumping current output. In particular, the inventors have recognized that the engine-off state of a hybrid vehicle provides an opportunity where the UEGO sensor and/or the intake oxygen sensor are exposed to the ambient air pressure and humidity. During these conditions, the pressure dependence of the sensor can be leveraged to estimate the ambient air pressure. In particular, in the engine-off condition, the intake air is at ambient pressure but also the exhaust is at ambient pressure. This is true as long as the engine is off or being pulled-down (e.g., from an engine speed that is lower than a threshold speed, such as below 4000 rpm). Since the UEGO is exposed to ambient air at ambient pressure during this condition, the oxygen concentration estimated at the UEGO sensor will correlate with the ambient pressure. Likewise, the intake oxygen sensor can be used to estimate ambient air pressure during the above-mentioned conditions. In particular, when there is no engine fueling or combustion, and under the selected engine speed threshold, the intake air in the intake passage of the engine is representative of ambient air. Therefore, the ambient pressure of the intake air in the engine during those conditions is representative of (and exactly that of) an ambient pressure of the air surrounding the engine. During such conditions, an oxygen sensor can be used as an ambient pressure sensor.

The ambient pressure determined based on the oxygen sensor output may also be used to confirm, correct, or replace a modeled ambient pressure determined with an ambient pressure model, or that of a dedicated ambient pressure sensor (such as a barometric pressure (BP) sensor coupled to the intake passage, downstream of an air filter). For example, the ambient pressure model may estimate ambient pressure based on additional engine operating conditions (other than oxygen sensor outputs). However, the modeled estimate may have decreased accuracy over the oxygen sensor estimate, especially when the engine operating conditions are outside a set window (e.g., set engine operating conditions) for modeling the ambient pressure using the selected engine operating conditions. Errors in the modeled ambient pressure may cascade to other engine control models and/or engine control routines that use the modeled ambient pressure as an input, thereby decreasing the accuracy of engine control. Determining the ambient pressure based on oxygen sensor outputs, as described above and as detailed further below, may provide a more accurate ambient pressure estimate, thereby increasing the accuracy of engine control.

In another example, the exhaust oxygen sensor (e.g., UEGO sensor of FIG. 2 and/or exhaust gas sensor 126 of FIG. 1) may operate as a traditional oxygen sensor (e.g., air-fuel sensor), at the lower, first reference voltage (e.g., approximately 450 mV). This lower voltage may be referred to herein as the base reference voltage. Said another way, the UEGO may be operated as an air-fuel sensor in order to determine an exhaust air-fuel ratio. In some examples, an estimate of the ethanol content of the fuel burned in the engine (e.g., EtOH estimate) may then be estimated based on the air-fuel ratio.

In another example, the intake oxygen sensor (e.g., intake oxygen sensor of FIG. 2 and/or linear oxygen sensor 172 of FIG. 1) may operate as a traditional oxygen sensor at the lower, first reference voltage (e.g., approximately 450 mV). This lower voltage may be referred to herein as the base reference voltage. Said another way, the linear oxygen sensor may be operated as oxygen sensor in order to determine a combustion air-fuel ratio.

Further still, both intake and exhaust oxygen sensors may be operated to provide an ambient humidity estimate by being operated in a variable voltage (VVs) mode. When operating in the VVs mode, a reference voltage of the oxygen sensor is increased from a lower, base voltage (e.g., approximately 450 my, also referred to herein as nominal conditions) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor.

In this way, FIGS. 1 and 2 enable a vehicle system comprising wheels, an engine for propelling the wheels via engine torque, an electric motor for propelling the wheels via motor torque, an oxygen sensor coupled to an exhaust passage of the engine; and a controller. The controller may be configured with computer readable instructions stored on non-transitory memory for adjusting engine operation based on an ambient pressure of intake air flowing through an intake passage of the engine, wherein the ambient pressure is estimated during an engine non-fueling condition based on an output of the oxygen sensor at a reference voltage where water molecules are not dissociated and further based on an ambient humidity and a conversion factor. For example, the ambient pressure (that is, the pressure of ambient air entering the engine) may be estimated by the oxygen sensor (being used as a pressure sensor) during an engine pull-down from a threshold speed where the vehicle wheels are propelled via the motor torque. The controller may include instructions for correcting the output of the oxygen sensor at the reference voltage based on the ambient humidity (which may also be estimated by the same oxygen sensor). Further, the vehicle system may comprise a pressure sensor coupled to the intake passage of the engine, wherein the controller includes further instructions for estimating the ambient pressure via the pressure sensor when the engine is operating fueled. The controller may then diagnose the pressure sensor based on the output of the oxygen sensor, the controller indicating degradation of the pressure sensor based on the ambient pressure estimated via the pressure sensor relative to the ambient pressure estimated via the oxygen sensor. Herein, the reference voltage may be a lower voltage where water molecules do not dissociate at the oxygen sensor, the controller including further instructions for estimating the ambient humidity during the engine pull-down based on a difference in output of the oxygen sensor upon modulation of the reference voltage between the lower voltage and an upper voltage where water molecules do dissociate at the oxygen sensor. As used herein, the output of the oxygen sensor includes a pumping current output upon application of the reference voltage (upper or lower voltages, as applicable).

Turning to FIG. 3, a method 300 is shown for operating the oxygen sensor of FIGS. 1-2 as an oxygen sensor during selected conditions and as an ambient condition sensor (including an ambient humidity sensor or an ambient pressure sensor) during other conditions. The method enables the same sensor to be used for the estimation or confirmation of various engine operating parameters. Method 300 and the other methods described herein may be executed by a controller, such as controller 12 shown in FIG. 1, according to instructions stored in a memory of the controller.

Method 300 begins at 302 by estimating and/or measuring vehicle and engine operating conditions. Vehicle operating conditions may include driver torque demand, vehicle speed, current engine load, boost level, engine speed, exhaust air/fuel ratio, engine temperature, ambient humidity, ambient pressure, mass air flow, EGR flow, intake pressure, etc. At 304, the method includes determining a mode of operation for the hybrid electric vehicle based on the estimated operating conditions. For example, in response to operator torque demand being lower than a first threshold, the vehicle may be operated in an electric mode with the vehicle wheels being propelled using motor torque only. As another example, in response to operator torque demand being higher than the first threshold, the vehicle may be operated in an engine mode with the vehicle wheels being propelled using engine torque only. Further still, in response to operator torque demand being higher than a second threshold, the second threshold higher than the first threshold, the vehicle may be operated in an assist mode with the vehicle wheels being propelled using each of motor torque and engine torque.

At 306, it is confirmed if the engine is on and the vehicle is being propelled with at least some engine torque (such as in the engine and assist modes). If the engine is being used to propel the vehicles, at 308, it may be determined if a non-fueling condition is present. In one example, a non-fueling condition may be present during a deceleration fuel shut-off (DFSO) event, such as when the vehicle is decelerating or coasting. If an engine non-fueling condition is confirmed, the method moves to 314 to opportunistically estimate ambient humidity using the oxygen sensor. As elaborated with reference to FIG. 5, the oxygen sensor is operated in a variable voltage mode (VVs) to determine an ambient humidity of the ambient air based on the pumping currents output by the intake or exhaust oxygen sensor at each of a first, lower and a second, higher reference voltage. The ambient humidity estimate may then be used to adjust engine operation.

Returning to 308, if engine fueling conditions are confirmed, the method moves to 310 and proceeds to operate the intake oxygen sensor and/or exhaust gas sensor for estimating the oxygen content of the charge flowing through the sensor. This enables the sensor to be used as an air/fuel ratio sensor.

The estimating includes the controller operating the exhaust oxygen sensor (e.g., oxygen sensor 126 or 200 shown in FIGS. 1-2) as an air/fuel sensor, and/or operating the intake oxygen sensor (e.g., oxygen sensor 172 or 200 shown in FIGS. 1-2), and measuring a first pumping current (Ip) generated by a lower, first reference voltage applied to the oxygen sensor. The lower, first reference voltage may be a reference voltage low enough such that water vapor and carbon dioxide are not dissociated (e.g., approximately 450 mV). The first pumping current of the oxygen sensor at the first reference voltage may be relatively unaffected by changes in ambient humidity or ethanol concentration of the fuel because water vapor and carbon dioxide are not dissociated. Thus, the first pumping current may be directly related to an oxygen content of the charge, and thereby to a combustion air/fuel ratio. The controller may then proceed to 312 to estimate the air/fuel ratio based on the pumping current measured at 310. For example, the controller may estimate the air/fuel ratio based on a change in the pumping current from a reference point when fuel was not being injected to the engine such as during a deceleration fuel shut-off (DFSO) event.

If it determined at 306 that the engine is not on and that the vehicle is being propelled with motor torque (such as in the electric mode), then at 320, it is determined if operating conditions are within a window for humidity detection by the oxygen sensor. As such, the frequency of DFSO events may be irregular and inconsistent, as DFSO requires a particular vehicle state to be confirmed. This reduces the opportunity for detecting humidity via the oxygen sensor during DFSO events. In addition, humidity estimation via VVs operation of the exhaust UEGO may require a DFSO event of a certain length, which further shrinks the available humidity detection window. To provide humidity information more often, additional humidity detection windows that are non-DFSO event based are required. One such opportunity exists during an engine pulldown when a hybrid vehicle transitions from an engine mode to an electric mode. Therein, during engine pulldown, combustion tops and the engine spins down towards a resting state. While spinning down, intake air is pulled through the intake manifold and out the exhaust manifold, clearing out combustion gases. Consequently, both the intake oxygen sensor and the exhaust UEGO are exposed to ambient air at this time, providing a humidity detection opportunity. However, an engine pulldown from low speeds (such as below 4000 rpm) may not provide sufficient ambient air and therefore an engine speed threshold is applied in the humidity detection window.

Thus, at 320, if the humidity detection window is confirmed (that is, if the vehicle is operating in the electric mode, and the engine is being pulled down from higher than a threshold speed), the method moves to 322 to opportunistically estimate ambient humidity using the oxygen sensor. As elaborated with reference to FIG. 5, the oxygen sensor is operated in a variable voltage mode (VVs) to determine an ambient humidity of the ambient air based on the pumping currents output by the intake or exhaust oxygen sensor at each of a first, lower and a second, higher reference voltage. In particular, estimating the ambient humidity may include sequentially applying each of the first, lower and the second, higher reference voltage to the oxygen sensor and estimating the ambient humidity based on a first pumping current output by the sensor upon application of the first voltage relative to a second pumping current output by the sensor upon application of the second voltage. Herein, the first voltage is a voltage where water molecules do not dissociate at the sensor while the second voltage is a voltage where water molecules do dissociate at the sensor. The ambient humidity estimate may then be used to adjust vehicle operation, such as to adjust engine operation when the vehicle is transitioned to an engine mode.

If the humidity detection window is not confirmed, at 324 the routine includes retrieving the ambient humidity estimated from an alternate source, such as from a dedicated humidity sensor coupled to the intake passage. Alternatively, the ambient humidity may be modeled or inferred based on vehicle operating conditions. From each of 322 and 324, the method then proceeds to 326 wherein it is determined if an ambient pressure estimation is desired. In one example, an ambient pressure estimation may be desired every threshold distance or duration of vehicle travel. In another example, ambient pressure estimation may be desired if a threshold duration has elapsed since a last ambient pressure estimation. If ambient pressure estimation is not desired, the routine ends and the oxygen sensor is not used until engine operation resumes.

If ambient pressure estimation is desired, then at 328, it is determined if the oxygen sensor has been characterized for pressure dependency. That is, it is determined if a factor or function corresponding to the pressure dependency of the particular intake oxygen sensor and/or exhaust gas sensor has already been learned. In one example, the pressure dependency may be characterized during previous engine operation (over the same driver cycle or multiple drive cycles) based on the sensor's response to varied pressure in ambient air, as described with reference to FIG. 6. The pressure dependency function may be stored in and retrieved from the controller's memory, if available. If the sensor has not been characterized, at 330 the method proceeds to characterize the sensor and learn the pressure dependency.

Next, at 332, the controller operates the oxygen sensor as a pressure sensor to estimate the ambient pressure of ambient air entering the engine using the intake or exhaust oxygen sensor, as detailed above with reference to FIG. 4. The inventors have recognized that the engine off state in the hybrid vehicle provides an opportunity where the oxygen sensor's pressure dependence responds to ambient pressure. In an engine-off condition, where there is no combustion, the exhaust is at ambient pressure. This is true as long as the engine is off or being pulled down from an engine speed that is below a threshold speed (such as below 4000 rpm). During these conditions, the exhaust gas sensor will be exposed to ambient air at ambient pressure. Thus, an oxygen concentration estimated by the sensor during these conditions may be correlated with ambient pressure, after compensating for changes in oxygen output due to ambient humidity. Once humidity is compensated for, the ambient oxygen in the air will only vary based on the ambient pressure. Therefore, based on a change between the corrected pumping current output by the sensor and a reference pumping current, and further based on the learned pressure dependency of the given sensor, the ambient pressure may be estimated. In other words, the output of the oxygen sensor can be used during the selected conditions to estimate the ambient pressure of the ambient air.

As elaborated below, estimating the ambient pressure includes applying a reference voltage to the oxygen sensor during engine non-fueling conditions (e.g., applying a first lower reference voltage at which water molecules do not dissociate at the oxygen sensor), correcting a pumping current output by the oxygen sensor (upon application of the reference voltage) based on ambient humidity, and estimating the ambient pressure based on the corrected pumping current and a conversion factor that converts the corrected pumping current into an equivalent ambient pressure. The conversion factor is based on a learned ambient pressure dependency of the given oxygen sensor. As discussed above, the ambient humidity may be learned via the output of the same oxygen sensor, or an alternate dedicated humidity sensor.

After estimating the ambient pressure, the method then proceeds to 334 to adjust vehicle operation based on the estimated ambient pressure. As an example, during subsequent engine operation, the controller may adjust other sensor, models, and operations that are affected by an ambient pressure variable based on the ambient pressure estimate. Adjusting the engine operation may include, as non-limiting examples, one or more of adjusting engine fueling, engine aircharge, and engine boosting. Thus, the controller may adjust the engine operation while propelling the hybrid vehicle using engine torque based on an ambient pressure of intake air estimated while propelling the vehicle using motor torque.

In this way, when propelling a hybrid vehicle using engine torque, combustion air-fuel ratio may be estimated via an oxygen sensor. Then, when propelling the hybrid vehicle using motor torque (and while engine speed is less than a threshold speed, such as during an engine pull-down), an ambient pressure of intake air received in the engine may be estimated via the same oxygen sensor. Herein, the oxygen sensor may be one of an exhaust gas sensor coupled in an exhaust passage of the engine of the hybrid vehicle, upstream of an exhaust catalyst, or an intake oxygen sensor coupled to an intake passage of the engine, downstream of an intake throttle.

Turning now to FIG. 4, an example method 400 is shown for operating the oxygen sensor of FIGS. 1-2 as a pressure sensor for ambient pressure estimation. The method of FIG. 4 may be performed as part of the method of FIG. 3, such as at 332.

At 402, the method includes confirming that operating conditions are within the ambient pressure estimation window. In one example, ambient pressure estimation conditions are confirmed if the hybrid vehicle is operating in an electric mode, with the engine shutdown or the engine pulled down to below a threshold speed (such as below 4000 rpm). If the conditions are not confirmed, the routine ends and the oxygen sensors resume being used as an oxygen sensor when the engine operation resumes.

Upon confirmation of ambient pressure estimation conditions, at 404, the method includes operating the exhaust oxygen sensor and/or the intake oxygen sensor at a first, lower reference voltage Vs (e.g., at 450 mV) and measuring a pumping current, Ip, output by the oxygen sensor. Herein, the first reference voltage is a voltage at which water molecules do not dissociate.

Next, at 406, the oxygen sensor output Ip is corrected based on ambient humidity. As such, the oxygen concentration seen in the ambient air due to humidity may be already known based on a prior humidity measurement performed by the same oxygen sensor (while operating in the VVs mode), or by an alternate source, such as a dedicated humidity sensor. Once the effect of humidity on the oxygen sensor output is compensated for, the true ambient oxygen content in the ambient air may be determined. This value now varies only based on the ambient pressure and therefore the ambient pressure can be determined therefrom.

At 408, the pressure dependency function (K) of the sensor is retrieved from the controller's memory. As elaborated with reference to FIG. 7, this function may have been previously mapped based on the characterization of the oxygen sensor's response to varied pressure in ambient air. The pressure dependency of the sensor could either be previously mapped or it could be an initially stored value for that particular sensor. As such, an ambient pressure characterization flag may be set responsive to a variety of conditions. As one example, ambient pressure characterization is triggered responsive to a change in elevation as measured by a device such as an altimeter sensor, or an engine BP sensor. This elevation information may also be obtained through various other methods such as receiving information from the cloud, using stored map data information (e.g., in a vehicle's navigation system), vehicle-to-vehicle (V2V) communication with vehicles that have elevation information, communication with wearables or other auxiliary devices that have elevation information. Other triggers for the ambient pressure characterization flag include a change in humidity that would be significant enough to require another pressure measurement. This is because more humid air is less dense then dry air. Similarly if there is enough change in temperature another measurement would be taken since warm air is less dense than cold air.

A vehicle supplier may bin the various oxygen sensors of the engine pre vehicle installation based on the sensor's K factor. This information would be stored and readable through the controller's memory. One example equation that may be used to determine the K factor for a given oxygen sensor is as follows: $I_p(p)=I_p(p_o)*p/(p+k)*(k+p_o)/p_o$;

where $I_p(p)$ is pumping current at pressure p, $I_p(p_o)$ is pumping current at pressure $p_o$, $p_o$ is at 1.013 bar, and p is the test pressure.

Next, at 410, the method includes estimating the ambient pressure of the ambient air based on the pressure dependency of the sensor and further based on an offset between the humidity compensated pumping current output by the oxygen sensor (IPmeas) and a reference pumping current output by the sensor (IPref). In particular, the ambient pressure may be determined according to the equation:

Amb_bp=(IPmeas−Ipref)*K, wherein Amb_bp represents the ambient pressure, and K represents the pressure dependency. Essentially, K is a conversion factor or factor that converts the pumping current to an equivalent pressure value. After determining the ambient pressure, at 412, the controller may adjust engine operation based on the ambient pressure.

In addition, the ambient pressure estimate inferred based on the oxygen sensor output may be used to confirm, or correct the accuracy of other pressure sources. For example, an ambient pressure estimate received from a dedicated pressure sensor coupled to the engine intake passage may be compared to the ambient pressure estimate inferred based on the oxygen sensor output. Based on a discrepancy, the pressure output by the sensor may be confirmed or updated. Furthermore, pressure sensor degradation may be identified based on the discrepancy. As another example, an ambient pressure estimated based on a model may be compared to the ambient pressure estimate inferred based on the oxygen sensor output, and based on a discrepancy, the model may be confirmed or updated.

In this way, during an engine-off condition (such as when the engine is decelerating unfueled from a threshold speed), an ambient pressure of intake air may be estimated based on an output (e.g., pumping current) of an oxygen sensor, such as a sensor disposed in the exhaust passage or the intake passage of the engine, at a reference voltage and an ambient humidity estimate. Then, during a subsequent engine-on condition, engine operation may be adjusted based on the ambient humidity estimate. Further, the ambient humidity may be estimated during the engine-off condition based on a difference in output of the oxygen sensor upon modulation of the reference voltage between an upper and a lower voltage. In this way, the pressure information from an oxygen sensor can be used to more accurately tune the powertrain performance. In addition, by relying on a single sensor for oxygen sensing during a first set of conditions, and ambient pressure sensing during a second, different set of conditions, sensor costs are reduced.

Turning now to FIG. 5, a method 500 is shown for estimating ambient humidity using the intake or exhaust oxygen sensor of FIGS. 1-2 (such as exhaust oxygen sensor 126 and intake oxygen sensor 172 shown in FIG. 1 and sensor 200 shown in FIG. 2) by operating the sensor in a VVs mode. The method enables an oxygen sensor to be used for oxygen sensing during a first set of conditions, and ambient humidity sensing during a second, different set of conditions, reducing sensor costs.

The method begins at 502 by determining if operating conditions are within the window for ambient humidity estimation. In one example, method 500 may continue from 314 or 322 of method 300, as described above. As such, if the engine is operating under non-fueling conditions, the method may continue to 504. In another example, method 500 may be executed after a duration, such as after a period of engine operation, a number of engine cylinders, a duration of vehicle travel, or after a distance of vehicle travel. In another example, method 500 may be executed upon engine start-up. If it is not time for ambient humidity estimation, the method continues to 503 to not estimate ambient humidity and the method ends. If an ambient humidity measurement is requested from another control routine, the controller may look-up a previously stored ambient humidity estimate.

At 504, the method includes determining if there is an incoming transmission shift. An incoming transmission shift may be predicted based on one or more of whether or not a shift request flag has been set, observation of one or more operator pedals, and/or vehicle acceleration. During transmission shifts following non-fueling conditions (e.g., deceleration fuel-shut off), humidity detection using the exhaust oxygen sensor may not be possible due to the need to decrease load during the transmission shift (and humidity detection using the exhaust oxygen sensor may include opening the throttle to reduce PCV noise). Thus, if a transmission shift is predicted at 504, the method continues to 506 to determine the ambient humidity using an alternate method. As one example, the alternate method may include measuring humidity from a dedicated humidity sensor (if the engine includes a humidity sensor). As another example, the alternate method for determining humidity may include estimating ambient humidity based on ambient air temperature. For example, ambient humidity may be estimated based on the ambient air temperature and a saturation vapor pressure estimated using an assumption of 50% relative humidity. An equivalent pumping current may then be determined based on the humidity estimate.

Alternatively, if there is not an incoming transmission shift predicted at 504, the method continues on to 508 to open the intake throttle (e.g., throttle 62 shown in FIG. 1) to further reduce the amount of hydrocarbons flowing past the oxygen sensor (e.g., exhaust oxygen sensor 126 or intake oxygen sensor 172 shown in FIG. 1 and/or sensor 200 shown in FIG. 2). For example, opening the throttle may reduce the amount of hydrocarbons from PCV coming through the exhaust air. More specifically, if the intake throttle is closed during an engine non-fueling condition, a large intake manifold vacuum is generated which can draw in positive crankcase ventilation (PCV) hydrocarbons. As such, even if a PCV port is closed during the DFSO, the vacuum may be sufficiently strong to draw in PCV hydrocarbons through the piston rings. The PCV flow drawn in may be aggravated in an aging engine due to leakage of PCV gases past the piston rings and valves. The ingested hydrocarbons may affect the output of the oxygen sensor and can confound the humidity measurements. In particular, the hydrocarbon effect leads to a sensor output that overestimates the ambient humidity.

At 510, the method includes determining if the oxygen sensor should be operated in variable voltage (VVs) mode. As described above, VVs mode includes adjusting the reference voltage (also referred to herein as the pumping voltage) of the oxygen sensor from a lower, base voltage (e.g., approximately 450 mV) to a higher, target voltage where water molecules are dissociated at the sensor. In some examples, operating in VVs mode may include continuously modulating the reference voltage between the base voltage (e.g., first voltage) and the target voltage (e.g., second voltage). In some examples, continuously operating the oxygen sensor in VVs mode, and particularly at the higher, second voltage may degrade the sensor over time. Thus, it may be advantageous to reduce the amount of time the sensor spends operating in VVs mode. In one example, the sensor may only be operated in VVs mode if a duration has passed since a previous VVs operation period. In another example, the sensor may only be operated in VVs mode if a total duration of VVs mode operation for a period of engine use is below an upper threshold level. In yet another example, the sensor may operate in VVs mode based on a duration (e.g., amount of time elapsed) since a previous measurement. The sensor may also be turned off if a total threshold time has passed since a measurement. In another embodiment, continuously operating the oxygen sensor at the higher, second voltage may not degrade the sensor if the gas composition and second voltage are within certain threshold ranges that reduce degradation. In this embodiment, if the gas composition and second voltage of the sensor are maintained within their threshold ranges, the sensor may default to operating in VVs mode and the method may continue to 512.

If the controller determines that it is able operate the oxygen sensor in VVs mode, the method continues on to 512 to modulate the reference voltage of the oxygen sensor between the first voltage (V1) and the second voltage (V2). For example, the method at 512 includes first, at 514, applying the first voltage (V1) to the oxygen pumping cell of the exhaust gas sensor and a receiving the first pumping current (Ip1). The first reference voltage may have a value such that oxygen is pumped from the cell, but low enough that oxygen compounds such as H2O (e.g., water) are not dissociated (e.g., V1=approximately 450 mV). Application of the first voltage generates an output of the sensor in the form of the first pumping current (Ip1) that is indicative of the amount of oxygen in the sample gas. In this example, because the engine is under non-fueling conditions, the amount of oxygen may correspond to the amount of oxygen in the fresh air surrounding the vehicle. The method at 512 further includes, at 516, applying the second voltage (V2) to the oxygen pumping cell of the sensor and receiving a second pumping current (Ip2). The second voltage may be greater than the first voltage applied to the sensor. In particular, the second voltage may have a value high enough to dissociate a desired oxygen compound. For example, the second voltage may be high enough to dissociate H2O molecules into hydrogen and oxygen (e.g., V2=approximately 1.1 V, or 950 mV). Application of the second voltage generates the second pumping current (I2) that is indicative of the amount of oxygen and water in the sample gas. It will be understood that the term "water" in the "amount of oxygen and water" as used herein refers to the amount of oxygen from the dissociated H2O molecules in the sample gas.

The ambient humidity (e.g., absolute humidity of the fresh air surrounding the vehicle) may be determined at 518 of routine 500 based on the first pumping current and the second pumping current (or the correction first and second pumping current). For example, the first pumping current may be subtracted from the second pumping current to obtain a change in pumping current indicative of the amount of oxygen from dissociated water molecules (e.g., the amount of water) in the sample gas. This value may be proportional to the ambient humidity. The ambient humidity value may be used to correct the pumping current outputs at 416 and 430 of method 400 and/or may be stored in the memory of the controller. In other examples, engine operation may be adjusted based on the determined ambient humidity.

Returning to 510, if operating the oxygen sensor in VVs mode is not desired, the method may instead include determining ambient humidity based on an output of the exhaust oxygen sensor at the first voltage and a dry air pumping current value. Specifically, the method at 520 includes determining a dry air pumping current. For example, the method may include operating the exhaust oxygen sensor at a first, lower voltage to obtain a first output which indicates a humid air oxygen reading. The sensor may then be operated at a second, higher voltage to obtain a second output which indicates a humid air oxygen reading wherein all the humidity in the air has dissociated at the oxygen sensor. A middle voltage between the first, lower voltage and the second, higher voltage may produce an oxygen sensor output indicative of a dry air oxygen reading wherein partial dissociation of the humidity occurs. A dry air oxygen reading may then be estimated by a ratio between the first output and the second output. In this way, the dry air oxygen reading may be determined by operating the oxygen sensor in VVs mode. At 520, the controller may look up the most recently stored value of the dry air pumping current to use at 520.

The method continues on to 522 to apply the first, lower reference voltage (e.g., base voltage, V1) to the exhaust oxygen sensor and a pumping current (IpB) is received. As such, the method at 522 includes not operating the oxygen sensor in VVs mode and instead maintaining the reference voltage of the sensor at a lower, base level that reduces oxygen sensor degradation. Said another way, the method at 522 includes not modulating the reference voltage of the oxygen sensor between a lower first voltage and a higher second voltage. The resulting pumping current may be indicative of the amount of oxygen in the sample gas.

The routine then continues on to 524 to determine ambient humidity based on IpB (the pumping current determined at 522 during non-VVs sensor operation) and the dry air pumping current determined and/or looked up at 520. The amount of oxygen reduction due to the dilution effect of ambient humidity may then be determined based on the difference between the dry air pumping current and the pumping current IpB determined at 522. By multiplying by a conversion factor, this difference may then be converted from a pumping current to a humidity percentage. In this way, by comparing the output of the oxygen sensor operating in non-VVs mode at the base reference voltage to a stored dry air pumping current value, ambient humidity may be determined with continuously operating the oxygen sensor in VVs mode. The ambient humidity value determined at 524 may then be used to correct the pumping current outputs at 406 of method 400 and/or may be stored in the memory of the controller. In other examples, engine operation may be adjusted based on the determined ambient humidity.

Figure 6:
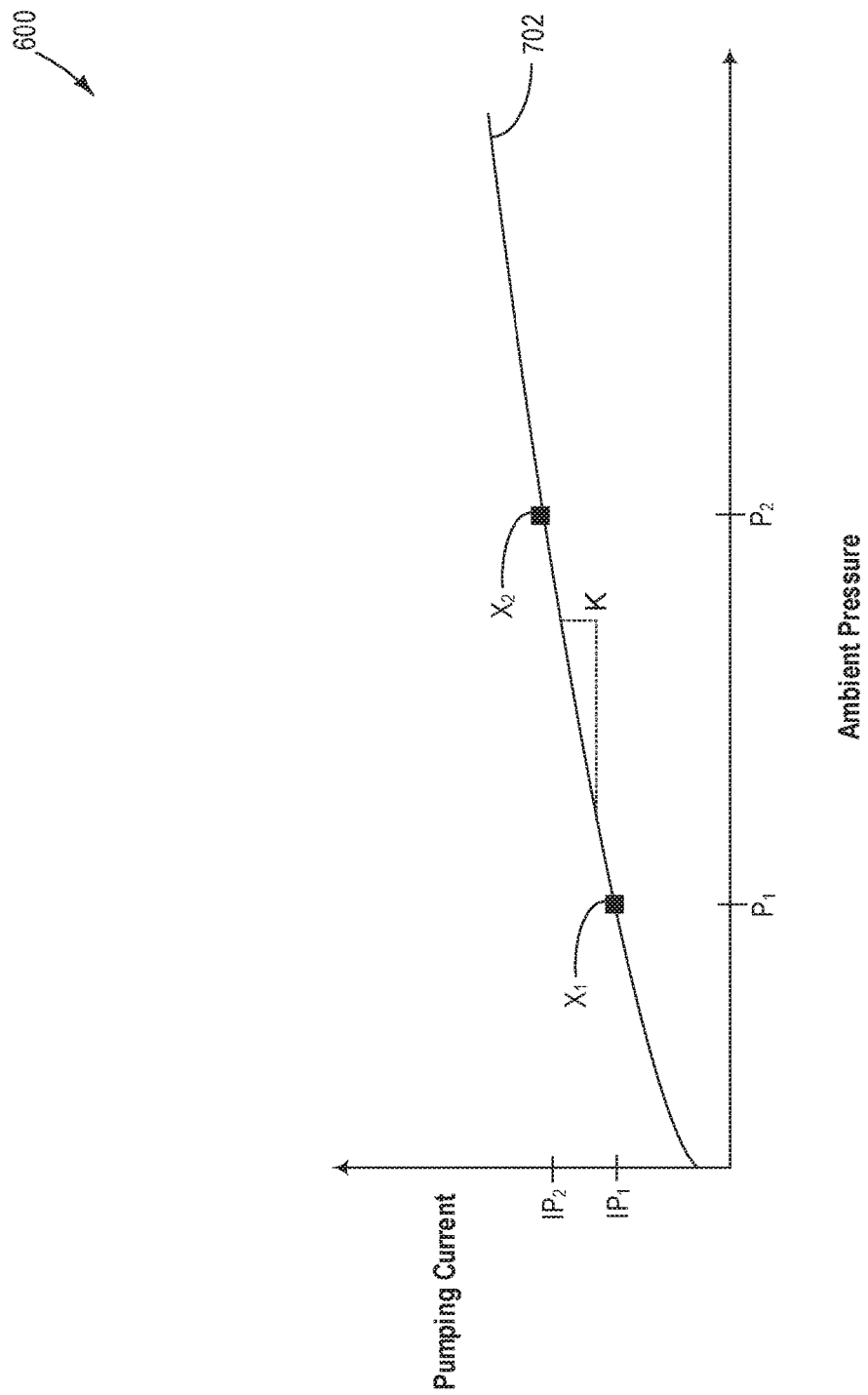
FIG. 6 shows a graph depicting the ambient pressure dependence of an intake or exhaust oxygen sensor.

Turning now to FIG. 6, plot 600 depicts an example characterization of the ambient pressure dependency of the oxygen sensor. This includes determination of a transfer function/factor relating the pumping current to the ambient pressure at the given applied reference voltage (e.g., the first reference voltage of approximately 450 my). Further, the transfer function may be limited to a baseline condition for the ambient humidity and ethanol concentration. In one example the baseline condition may be when the ethanol concentration and ambient humidity are both 0%. In another example the baseline condition may be based on an updated transfer function where the ambient humidity and ethanol concentration may be different than 0%. In one example, the transfer function may be stored in a memory of the controller as a function of oxygen sensor reference voltage.

The controller may determine Ip at an ambient pressure from the oxygen sensor. Then, the controller may determine the ambient pressure from that measurement using the pre-stored K factor for the sensor. Alternatively, the controller may determine the K factor for the sensor if the ambient pressure is already known from another source (such as an engine BP sensor).

In addition, the characterization includes determination of the reference pumping current (IPref) used for ambient pressure estimation. An example transfer function is depicted as plot 602 in graph 600. Plot 602 relates ambient pressure with reference pumping currents for a particular reference voltage. Plot 602 may be associated with an applied reference voltage of 450 mV. As such, plot 602 may represent a known relationship between pumping current and ambient pressure for the reference voltage applied to the oxygen sensor in method 400 when humidity and ethanol concentration are at a baseline condition. The controller may then use the transfer function associated with the reference voltage to determine a reference pumping current.

In one embodiment, the controller may determine the reference pumping current based on Ipref which is the dry air Ip corrected value for the oxygen sensor. In other words this would be the "perfect" expected value that the sensor should be reading at for dry air, at a particular pressure (such as sea level). This would be a known/expected value that is already stored as code in the controller's memory and would be used as a reference value for the Ip to be compared against. If the humidity effects are compensated for and the measurement that the sensor reading shows that the oxygen reading is 22% instead of 20.95%, then that extra increase in oxygen may be attributed to an increase in ambient pressure, since all other factors would have been previously corrected for.

In one example, the controller may look-up the pumping current defined by the transfer function associated with the reference voltage at a reference ambient pressure (e.g., standard or preset pressure). As an example, the reference ambient pressure may be $P_1$ depicted in graph 700. As seen in graph 700, the ambient pressure $P_1$ defines a point $X_1$ on plot 702. Point $X_1$ has an associated pumping current $IP_1$. Thus, $IP_1$ may be an example of the reference pumping current determined by the controller at 410. Point $X_1$ therefore may represent the reference pumping current that would be expected at the current ambient pressure in the exhaust gas or intake gas, under baseline humidity and ethanol concentration conditions.

In one example, a method for a hybrid vehicle comprises: when propelling the vehicle using engine torque, estimating combustion air-fuel ratio via an oxygen sensor; and when propelling the vehicle using motor torque, estimating an ambient intake air pressure via the oxygen sensor. In the preceding example, additionally or optionally, the oxygen sensor is an exhaust gas sensor coupled in an exhaust passage of an engine of the hybrid vehicle, upstream of an exhaust catalyst. In any or all of the preceding examples, additionally or optionally, the oxygen sensor is an intake oxygen sensor coupled to an intake passage of an engine of the hybrid vehicle, downstream of an intake throttle. In any or all of the preceding examples, additionally or optionally, when propelling the vehicle using motor torque includes while engine speed is less than a threshold speed. In any or all of the preceding examples, additionally or optionally, the estimating includes applying a reference voltage to the sensor, correcting a pumping current output by the oxygen sensor based on ambient humidity, and estimating the ambient intake air pressure based on the corrected pumping current and a conversion factor conversion factor, where the conversion factor converts the corrected pumping current into an equivalent ambient pressure. In any or all of the preceding examples, additionally or optionally, the conversion factor is based on a learned ambient pressure dependency of the oxygen sensor. In any or all of the preceding examples, additionally or optionally, the ambient humidity is estimated by the oxygen sensor during engine non-fueling conditions, and wherein the reference voltage is a first, lower reference voltage. In any or all of the preceding examples, additionally or optionally, estimating the ambient humidity includes sequentially applying each of the first, lower reference voltage and a second, higher reference voltage to the oxygen sensor, and estimating the ambient humidity based on a first pumping current output by the sensor upon application of the first voltage relative to a second pumping current output by the sensor upon application of the second voltage. In any or all of the preceding examples, additionally or optionally, the first voltage is a voltage at which water molecules are not dissociated at the oxygen sensor and the second voltage is a voltage at which water molecules are dissociated. In any or all of the preceding examples, additionally or optionally the method further comprises adjusting engine operation while propelling the vehicle using engine torque based on the ambient intake air pressure estimated while propelling the vehicle using motor torque, the adjusting engine operation including one or more of adjusting engine fueling, engine air charge, and engine boosting.

Another example method comprises: during an engine-off condition, estimating an ambient pressure of intake air based on an output of an oxygen sensor disposed in the exhaust passage at a reference voltage and an ambient humidity estimate; and during a subsequent engine-on condition, adjusting engine operation based on the ambient humidity estimate. In the preceding example, additionally or optionally, the engine-off condition includes the engine decelerating unfueled from a threshold speed. In any or all of the preceding examples, additionally or optionally, the method further comprises during the engine-off conditions, estimating an ambient humidity of the intake air based on a difference in output of the oxygen sensor upon modulation of the reference voltage between an upper and a lower voltage. In any or all of the preceding examples, additionally or optionally, the reference voltage is the lower voltage, and wherein estimating the ambient pressure includes correcting the output at the reference voltage based on the estimated ambient humidity and further based on a conversion factor that converts the corrected output into an equivalent ambient pressure. In any or all of the preceding examples, additionally or optionally, the output of the oxygen sensor are pumping currents output while the oxygen sensor is operating at the reference voltage. In any or all of the preceding examples, additionally or optionally, the method further comprises confirming one or more of an ambient pressure estimated by a pressure sensor coupled to an intake passage of the engine, and a modeled ambient pressure using the ambient pressure estimated based on the output of the oxygen sensor.

Another example vehicle system comprises: wheels; an engine for propelling the wheels via engine torque; an electric motor for propelling the wheels via motor torque; an oxygen sensor coupled to an exhaust passage of the engine; and a controller. The controller may be configured with computer readable instructions stored on non-transitory memory for: adjusting engine operation based on an ambient pressure of intake air flowing through an intake passage of the engine, where the ambient pressure is estimated during an engine non-fueling condition based on an output of the oxygen sensor at a reference voltage where water molecules are not dissociated and further based on an ambient humidity and a conversion factor. In the preceding example, additionally or optionally, the engine non-fueling condition includes an engine pull-down from a threshold speed where the vehicle wheels are propelled via the motor torque, and wherein the controller includes instructions for correcting the output of the oxygen sensor at the reference voltage based on the ambient humidity. In any or all of the preceding examples, additionally or optionally, the system further comprises a pressure sensor coupled to the intake passage of the engine, wherein the controller includes further instructions for estimating the ambient pressure via the pressure sensor when the engine is operating fueled and indicating degradation of the pressure sensor based on the ambient pressure estimated via the pressure sensor relative to the ambient pressure estimated via the oxygen sensor. In any or all of the preceding examples, additionally or optionally, the reference voltage is a lower voltage where water molecules do not dissociate at the oxygen sensor, the controller including further instructions for estimating the ambient humidity during the engine pull-down based on a difference in output of the oxygen sensor upon modulation of the reference voltage between the lower voltage and an upper voltage where water molecules do dissociate at the oxygen sensor, and wherein the output of the oxygen sensor includes a pumping current output upon application of the reference voltage.

In this way, ambient pressure may be estimated based on outputs of an intake or exhaust oxygen sensors already existing in an engine. The technical effect of relying on the pressure dependency of an oxygen sensor to estimate an ambient pressure is that the need for redundant sensors is reduced. Even if redundant sensors are present, the pressure estimated by the oxygen sensor can be used to confirm or correct the output of the dedicated ambient pressure sensor, improving accuracy of pressure estimation. In addition, pressure sensor degradation can be identified more reliably. Overall, ambient pressure may be estimated more accurately over a wider range of vehicle operating conditions. As a result, engine control in a hybrid vehicle may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
when propelling the vehicle using engine torque, estimating combustion air-fuel ratio via an oxygen sensor; and
when propelling the vehicle using motor torque, estimating an ambient pressure of intake air based on an estimate of humidity via the oxygen sensor.

2. The method of claim 1, wherein the oxygen sensor is an exhaust gas sensor coupled in an exhaust passage of an engine of the hybrid vehicle, upstream of an exhaust catalyst.

3. The method of claim 1, wherein the oxygen sensor is an intake oxygen sensor coupled to an intake passage of an engine of the hybrid vehicle, downstream of an intake throttle.

4. The method of claim 1, wherein engine speed is less than a threshold speed when propelling the vehicle using motor torque.

5. The method of claim 1, wherein the estimating of ambient pressure includes applying a reference voltage to the sensor, correcting a pumping current output by the oxygen sensor based on the estimate of humidity, and estimating the ambient pressure based on the corrected pumping current and a conversion factor, where the conversion factor converts the corrected pumping current into an equivalent ambient pressure.

6. The method of claim 5, wherein the conversion factor is based on a learned ambient pressure dependency of the oxygen sensor.

7. The method of claim 5, wherein the estimate of humidity is based on the oxygen sensor during engine non-fueling conditions, and wherein the reference voltage is a first, lower reference voltage.

8. The method of claim 7, wherein the estimate of humidity includes sequentially applying each of the first, lower reference voltage and a second, higher reference voltage to the oxygen sensor, and where the estimate of humidity is based on a first pumping current output by the sensor upon application of the first voltage relative to a second pumping current output by the sensor upon application of the second voltage.

9. The method of claim 8, wherein the first voltage is a voltage at which water molecules are not dissociated at the oxygen sensor and the second voltage is a voltage at which water molecules are dissociated.

10. The method of claim 1, further comprising, adjusting engine operation while propelling the vehicle using engine torque based on the ambient pressure of intake air estimated while propelling the vehicle using motor torque, the adjusting engine operation including one or more of adjusting engine fueling, engine air charge, and engine boosting.

11. A method, comprising:
during an engine-off condition, estimating an ambient pressure of intake air based on an ambient humidity estimate and an output of an oxygen sensor disposed in an exhaust passage at a reference voltage; and
during a subsequent engine-on condition, adjusting engine operation based on the ambient humidity estimate.

12. The method of claim 11, wherein the engine-off condition includes the engine decelerating unfueled from a threshold speed.

13. The method of claim 11, further comprising, during the engine-off condition, estimating an ambient humidity of intake air based on a difference in output of the oxygen sensor upon modulation of the reference voltage between an upper and a lower voltage.

14. The method of claim 13, wherein the reference voltage is the lower voltage, and wherein estimating the ambient pressure includes correcting the output at the reference voltage based on the estimated ambient humidity and further based on a conversion factor that converts the corrected output into an equivalent ambient pressure.

15. The method of claim 14, wherein the output of the oxygen sensor are pumping currents output while the oxygen sensor is operating at the reference voltage.

16. The method of claim 11, further comprising confirming one or more of an ambient pressure estimated by a pressure sensor coupled to an intake passage of the engine, and a modeled ambient pressure using the ambient pressure estimated based on the output of the oxygen sensor.

17. A vehicle system, comprising:
wheels;
an engine for propelling the wheels via engine torque;
an electric motor for propelling the wheels via motor torque;
an oxygen sensor coupled to an exhaust passage of the engine; and
a controller with computer readable instructions stored on non-transitory memory for:
adjusting engine operation based on an ambient pressure of intake air flowing through an intake passage of the engine, where the ambient pressure is estimated during an engine non-fueling condition based on an output of the oxygen sensor at a reference voltage where water molecules are not dissociated and further based on an ambient humidity estimate and a conversion factor.

18. The system of claim 17, wherein the engine non-fueling condition includes an engine pull-down from a threshold speed where the wheels are propelled via the motor torque, and wherein the controller includes instructions for correcting the output of the oxygen sensor at the reference voltage based on the ambient humidity estimate.

19. The system of claim 18, further comprising a pressure sensor coupled to the intake passage of the engine, wherein the controller includes further instructions for estimating the ambient pressure via the pressure sensor when the engine is operating fueled and indicating degradation of the pressure sensor based on the ambient pressure estimated via the pressure sensor relative to the ambient pressure estimated via the oxygen sensor.

20. The system of claim 17, wherein the reference voltage is a lower voltage where water molecules do not dissociate at the oxygen sensor, the controller including further instructions for estimating the ambient humidity estimate during the engine pull-down based on a difference in output of the oxygen sensor upon modulation of the reference voltage between the lower voltage and an upper voltage where water molecules do dissociate at the oxygen sensor, and wherein the output of the oxygen sensor includes a pumping current output upon application of the reference voltage.

* * * * *